(12) United States Patent  
Ho

(10) Patent No.: US 7,591,221 B2  
(45) Date of Patent: Sep. 22, 2009

(54) SALAD SHAKER

(75) Inventor: Chor Joseph Ho, Thornhill (CA)

(73) Assignee: Founder Plastics Inc., Toronto, Ontario (CA)

( * ) Notice: Subject to any disclaimer, the term of this patent is extended or adjusted under 35 U.S.C. 154(b) by 976 days.

(21) Appl. No.: 11/052,132

(22) Filed: Feb. 8, 2005

(65) Prior Publication Data

US 2006/0037485 A1 Feb. 23, 2006

(30) Foreign Application Priority Data

Aug. 18, 2004 (CA) .................................. 2477920

(51) Int. Cl.
*A23B 5/00* (2006.01)
*B65D 25/04* (2006.01)

(52) U.S. Cl. .................. 99/495; 220/521; 206/219; 206/220; 206/221; 215/DIG. 8; 53/285; 53/287

(58) Field of Classification Search ............. 99/495; 220/521; 206/219–221; 215/DIG. 8; 53/285, 53/287

See application file for complete search history.

(56) References Cited

U.S. PATENT DOCUMENTS

| 2,533,806 | A | * | 12/1950 | Holzapfel | .................. 206/221 |
| 4,319,614 | A | | 3/1982 | Boice | |
| 6,302,268 | B1 | | 10/2001 | Michaeli | |
| D450,219 | S | | 11/2001 | Smith | |

* cited by examiner

*Primary Examiner*—Shawntina Fuqua

(57) ABSTRACT

A salad shaker for selectively mixing a salad product with the dressing. In a storage/transportation position, salad stuffed in a bowl having a lid does not contact the dressing sealed in a container having a cover with a handle. In a mixing portion, the cover is removed from outside the shaker to release the dressing into the bowl for preparing the serving when desired.

20 Claims, 5 Drawing Sheets

SALAD SHAKER

FIELD OF INVENTION

This invention is directed to containers for non-contact storage of at least two components of a mixture, particularly to an ergonomic salad shaker.

BACKGROUND OF THE INVENTION

Salads are an important part of a healthy diet, being increasingly recommended by the medical profession and by all major low-calorie diets, such a Weight Watchers, Suzanne Somers, hypoglycemic index, etc. This trend emerged as a result of the increased heart diseases and strokes, diabetes, cancer, and other life-threatening diseases, which were scientifically linked to an unhealthy diet and obesity. At the same time, the medical community and even governments of industrialized countries initiated disease prevention programs for educating the public at large in the area of healthy living and in particular healthy eating. Consequently, the popularity of the foods in the "healthy" category increases as the public awareness increases.

To address this growing trend, numerous nutritionists and food suppliers began promoting salads to individual consumers and restaurants. To stay in business, new recipes containing innovative and exotic mixtures of ingredients, often times based on ethnic preferences have been proposed. The salad dressing selection also evolved lately, and it is possible now to buy low calories dressings, spicy or sweet sauces using ethnic or proprietary recipes. As the recipes used by the food supply industry evolve to more stylish tastes, people are tempted to use ready-to-eat salads rather than preparing their own mixture.

Consumption of in advance prepared salads is increasingly popular not only for health reasons; it also saves the consumer time otherwise spend on washing the salad ingredients and preparing the dressing. In addition, if the salad includes a plurality of ingredients (leafs of lettuce, radicchio, endives, cabbage, slices of carrots, etc) often times not the entire quantity of vegetables is ingested during one serving, and the rest is lost.

Typically, salad ingredients are sold in bowl-like containers and the dressing is sold separately, in a small container. This separation provides the user with some degree of liberty in making a mixture of his/her liking, and also to keep the salad ingredients fresh for later consumption. For preparing the mixture, the user opens the salad container and the dressing container, pours the dressing in the salad container and mixes the contents.

The main disadvantage of this type of packaging for commercially available salads is that the salad bowl is generally too small to enable the user to properly mix the salad ingredients with the dressing. Also, in fast food restaurants, the salad ingredients container and the salad dressing containers/dispensers are available at different counters. Some solutions were proposed to address this problem, as described next.

U.S. Pat. No. 4,319,614 (Bolce) "Salad dressing bottle and top stopper with individual server" issued on Mar. 16, 1982 describes a salad dressing dispenser comprised of a bottle with a top cover having a suspended individual serving cup sized to hold a salad dressing serving. In order to mix the salad with the dressing, the bottle is tilted and shaken to insure proper distribution of the dressing in the individual serving cup. However, this patent is not concerned with mixing salad ingredients with the dressing, but rather with homogenizing and portioning the dressing for individual consumers.

U.S. Pat. No. 6,302,268 (Michaeli) "Salad container having insert chamber" issued on Oct. 16, 2001 describes a salad container with a removable cover adapted to receive a chamber insert with the salad dressing. The chamber projects through the cover into the container and is sealed with a removable cap. By pressing on the cap a shaft (72) is actuated to open a chamber insert, the dressing is released into the container over the salad ingredients; mixing of the salad ingredients with the dressing may be obtained by shaking the container.

The opening of the chamber insert is sometime uncertain as shaft (72) may bend under pressure and nullify the result. As well, the container of Michaeli is manufactured using a blowing method involving high costs of manufacturing.

SUMMARY OF THE INVENTION

An object of the invention is to provide an ergonomic salad container that alleviates totally or in part the drawbacks of the prior art salad containers.

Another object of the invention is to provide an ergonomic salad container that enables the consumers to obtain a proper mixture of salad ingredients and dressing.

A still further object of the invention is to allow users to eat freshly mixed salads.

According to one aspect of the invention, a container for non-contact storage of at least two components of a mixture and allowing selective mixing of the components, is provided. The container comprises a bowl for receiving a first component, a compartment provided inside the bowl for receiving a second component, a removable lid for enclosing the components inside the bowl, and a cover assembly for sealing the second component into the compartment. The lid comprises an opening allowing access to the cover assembly for opening the compartment and facilitate mixing of the components.

Advantageously, the salad dispenser according to the invention provides an easy to manufacture, unitary packaging solution for the salad ingredients and dressing, while facilitating an excellent mix when desired.

Another advantage of the invention is that the salad shaker is reusable and easy to clean providing for costs and time savings.

BRIEF DESCRIPTION OF DRAWINGS

The following detailed description, given by way of example and not intended to limit the present invention solely thereto, will best be appreciated in conjunction with the accompanying drawings, wherein like reference numerals denote like elements and parts, where.

DETAILED DESCRIPTION OF THE INVENTION

In the following, the terms top and bottom are used with reference to the salad shaker when placed on a horizontal surface such as a table, desk, or the like; these terms are not intended to limit the invention to embodiments of the salad shaker placed on such a surface. It is also to be noted that while this disclosure refers to a salad product like salad alone or salad mixed with vegetables, the invention is equally suitable to use for other fast-food products necessitating pouring a gravy, sauce, etc. into a main dish. Still further, while the disclosure refers to a salad shaker, this is a particular embodiment of a culinary utensil, the invention may be also used for non-contact storage/transportation of at least two components of a certain mixture, which enables a user to prepare the final product when desired by mixing the components.

Figure 1A:
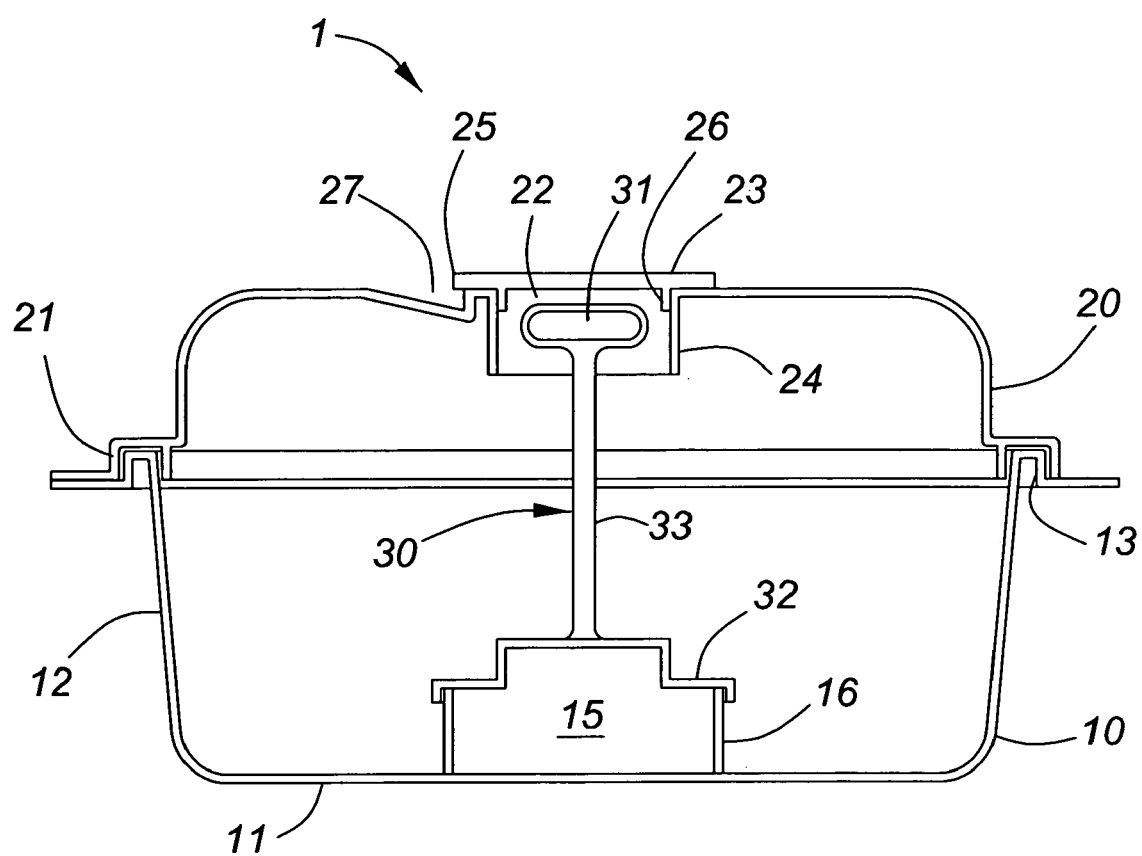
FIG. 1A is a transversal cross-section in the salad shaker according to an embodiment of the invention.
Figure 1B:
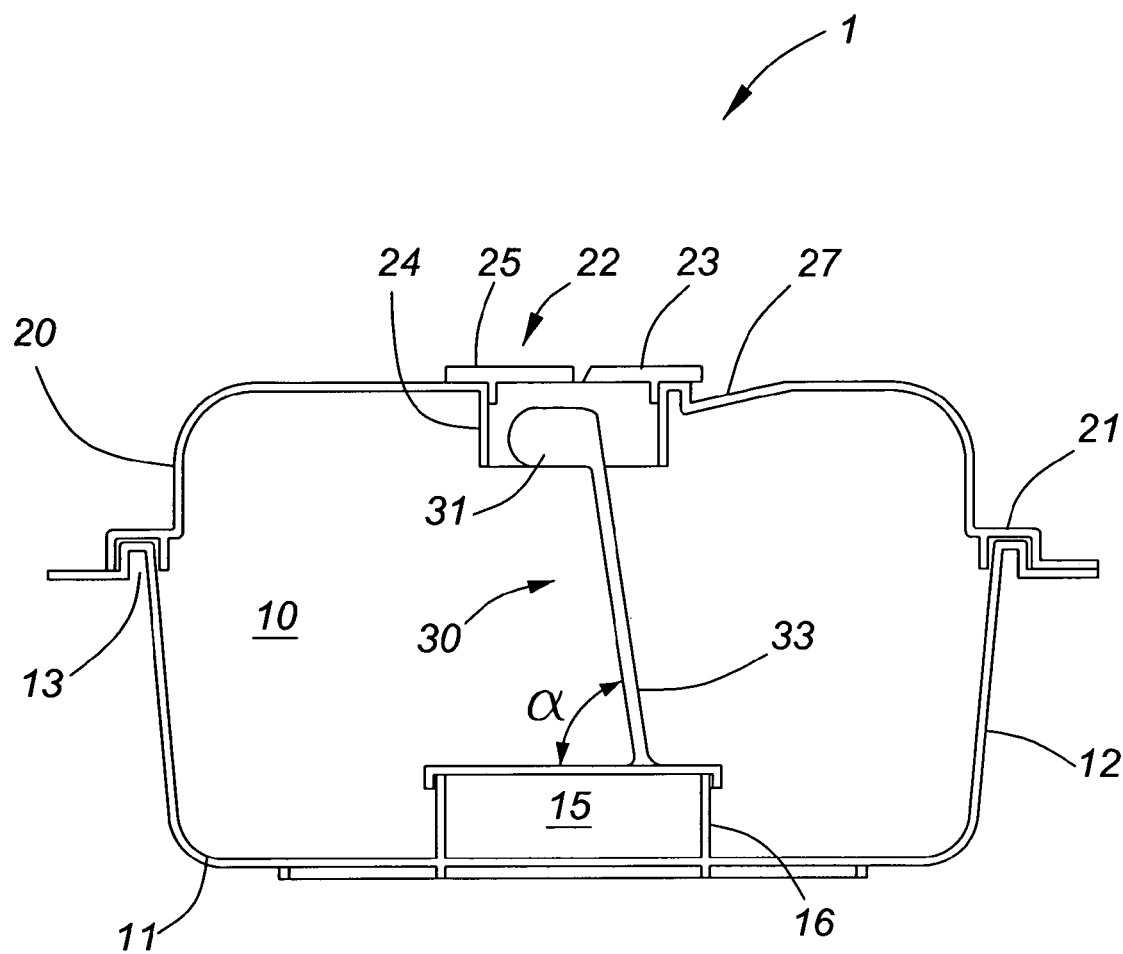
FIG. 1B is a transversal cross-section in the salad shaker according to another embodiment of the invention.

FIGS. 1A and 1B show a transversal cross-section in the salad shaker 1 according to two embodiments of the invention. The salad shaker comprises four main parts, namely a bowl 10, a removable lid 20, a dressing compartment 15 and a dressing cover assembly 30.

The bowl 10 is defined by a plane bottom wall 11 and a lateral wall 12, forming a unitary deep dish. While the general external shape of the bowl 10 is preferably cylindrical with the lateral wall 12 slightly tapering towards the bottom wall 11, evidently other shapes are equally possible, even irregular shapes for the lateral wall, if so desired. Locking means 13, 21, for removably attaching lid 20 to bowl 10 are provided at the upper edge of bowl 10 and at the lower edge of lid 20, respectively.

In one variant according to the invention, compartment 15 is fixed on the bottom wall 11 inside bowl 10. Preferably, compartment 15 is molded unitary with the bowl 10, or is fixed to the bottom 11 of bowl 20 with any suitable fixing means. Alternatively, compartment 15 may be fixed using attachment means provided at a suitable height on the lateral wall 11. Other ways of attaching compartment 15 to the bowl can equally be envisaged.

Lid 20 has a shape selected to complement the shape of the bowl; preferably, lid 20 has a domed appearance, as shown in the drawings. However, other shapes are also possible, as well known. As seen in FIGS. 1A and 1B, lid 20 is provided along the edge with a groove forming the first locking means 21 for engaging, in a storage position, a rim defined in the lateral wall 12 of bowl 10 and forming a second locking means 13. Groove 21 and rim 13 cooperate such that the content inside the bowl 10 is hermetically closed in the storage position. Any other suitable arrangement for the locking means 13, 21 may be equally used. Fins 40, 42, shown in FIGS. 3 and 4 allow the user to easily remove lid 20 to open and close the bowl 10. Fins 40 shown in FIGS. 3 and 4 allow the user to easily remove lid 20 to open the bowl 10.

According to the invention, lid 20 is provided with an opening 22, which is hermetically covered by a cap 23. The shape of the opening 22 and consequently of the covering cap 23 are preferably circular; however other shapes may be employed. The opening 22 is preferably placed in the center of the lid 20; however, it can be placed off the center in other embodiments, as discussed later. In such a case, the upper surface of lid 20 should preferably be flat, so that the shape of the cap 23 be regular enabling easy manufacture.

Lid 22 is provided with a gripping flap 25 and an indent 27 adjacent cap 23, enabling to grip and lift the cap 23. Removable cap 23 seals opening 22 as illustrated in FIG. 1A, and cap 23 may be provided with a circular rim 26 tightly engaging opening 22. Alternatively, as illustrated in FIG. 1B, cap 23 may be hingedly attached to lid 20, and also preferably provided with a gripping flap 25 and indent 27 for enabling the user to lift cap 23 in order to uncover opening 22.

Figure 2A:
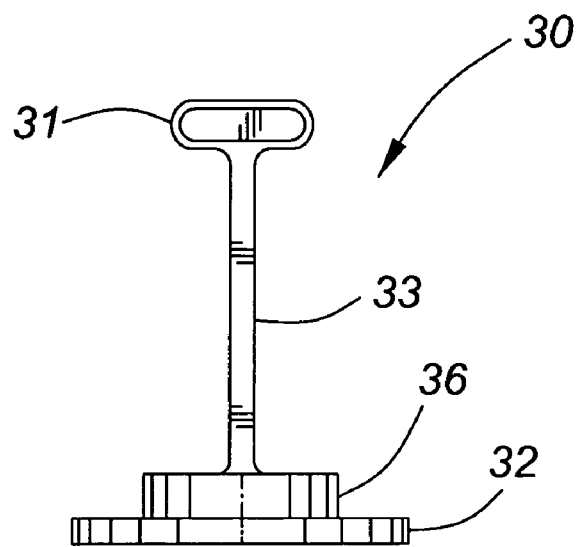
FIG. 2A is an isometric view of the dressing cover assembly of the container shown in FIG. 1A.
Figure 2B:
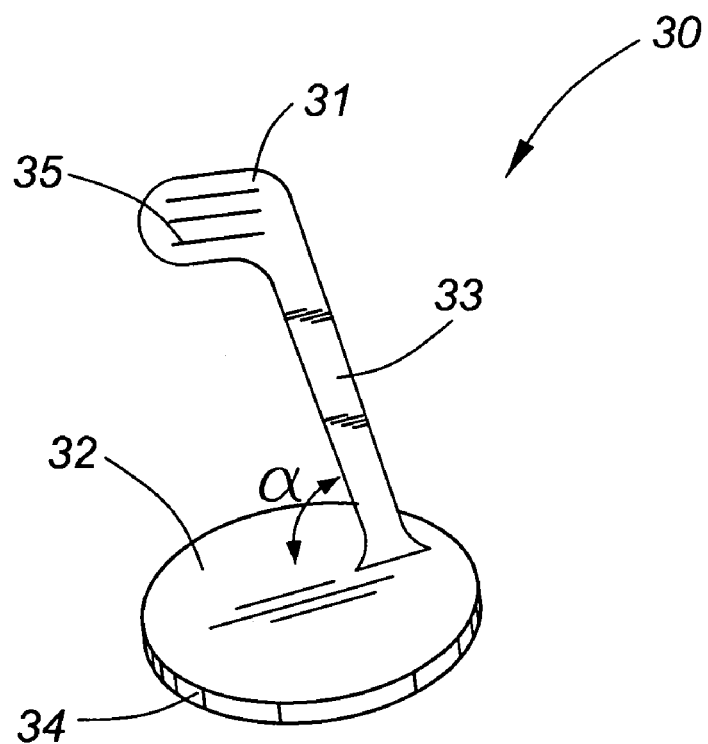
FIG. 2B is an isometric view of the dressing cover assembly of the container shown in FIG. 1B.

Dressing cover assembly 30, illustrated in FIGS. 2A and 2B, comprises a cover 32 for sealing the dressing in compartment 15, and a handle 33. Handle 33 extends from the upper edge of cover 32 and supports tab 31 at the free end. In the embodiment of FIG. 2A, handle 33 is attached to a central boss 36 of cover 32 and forms a right angle with cover 32. In the embodiment of FIG. 2B, handle 33 forms and acute angle α with cover 32 while opening 22 may be positioned on lid 20 in any convenient location for providing access to tab 31.

The shape of the cover 32 is preferably circular, for enabling easy opening of compartment 15. Cover 32 in FIG. 2B, has a lip 34 extending downwards along the entire circumference for tightly engaging the wall 16 of container 15. Lip 34 and wall 16 may be also provided with cooperating latching means for isolating the dressing during transportation and storage like for example an inside circumferential ridge on lip 34 and a matting circumferential groove on wall 16.

Opening 22 enables access to a well-shaped portion 24 defined by a circular wall. As discussed above, circular rim 26 of cap 23 forms a snap-fit on the cylindrical wall 24. Other shapes for the well 24 are equally possible, i.e. well 24 may be formed by three or more walls having triangular or polygonal cross-sections. The shape, and depth of the well is dictated by the shape and the size of a tab 31 provided on the dressing cover assembly 30 and is so selected to enable the user to grab tab 31 with two fingers. Tab 31 has preferably the shape shown in FIG. 2B, being provided with ridges 35 for enhancing a better grip through opening 22.

To summarize, opening 22, cap 23 and well 24 can have various shapes and sizes, designed not to hinder mixture of the salad ingredients contained in the bowl with the dressing, and to enable a user to grab, hold and pull tab 31.

Figure 3:
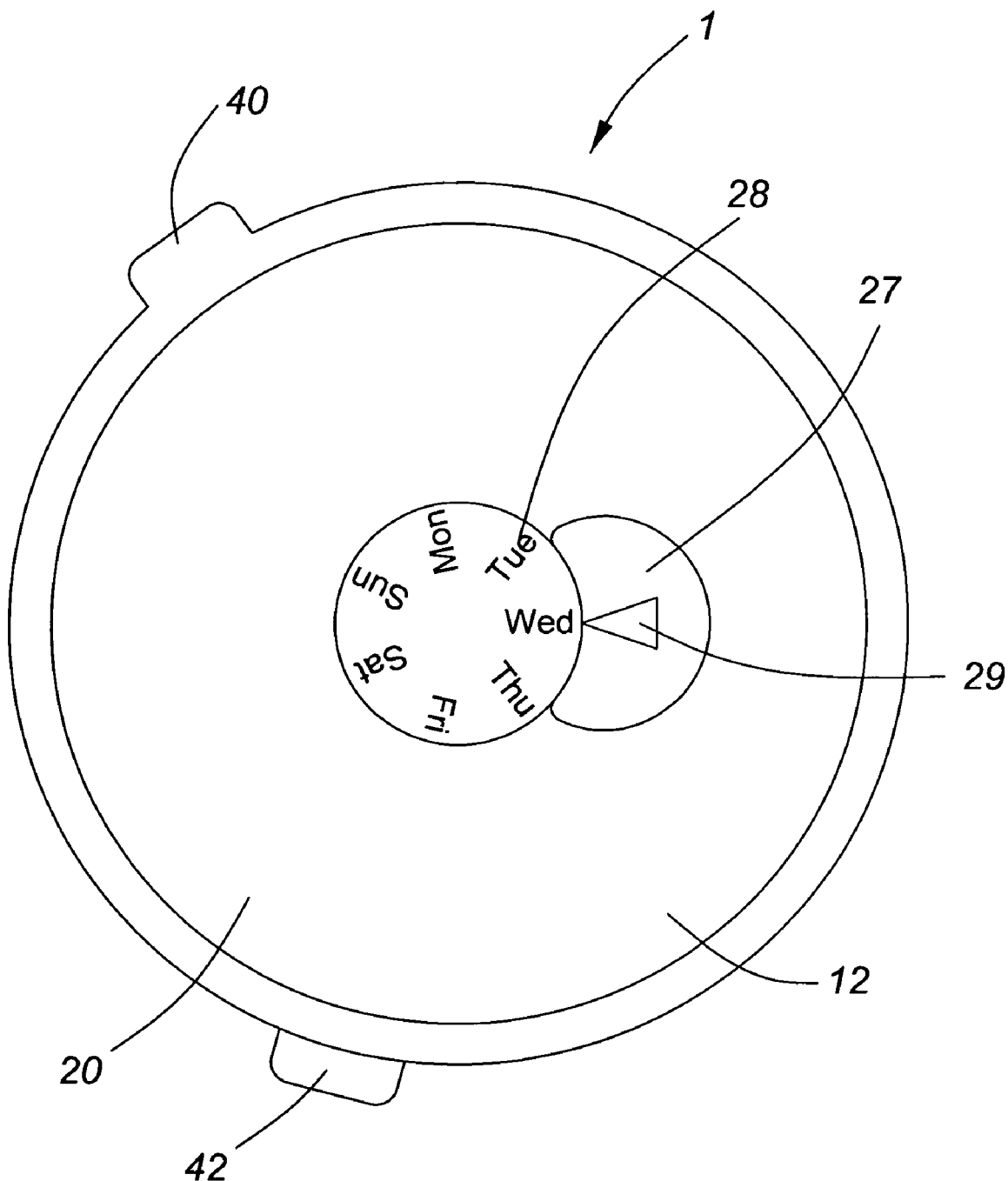
FIG. 3 is a top view of the salad shaker.

In addition, cap 23 may be provided with a dial 28 showing weekdays as seen in FIG. 3. In this case an arrow 29 on lid 20 allows the user to set a weekday when, for example, a particular product is to be served.

Figure 4:
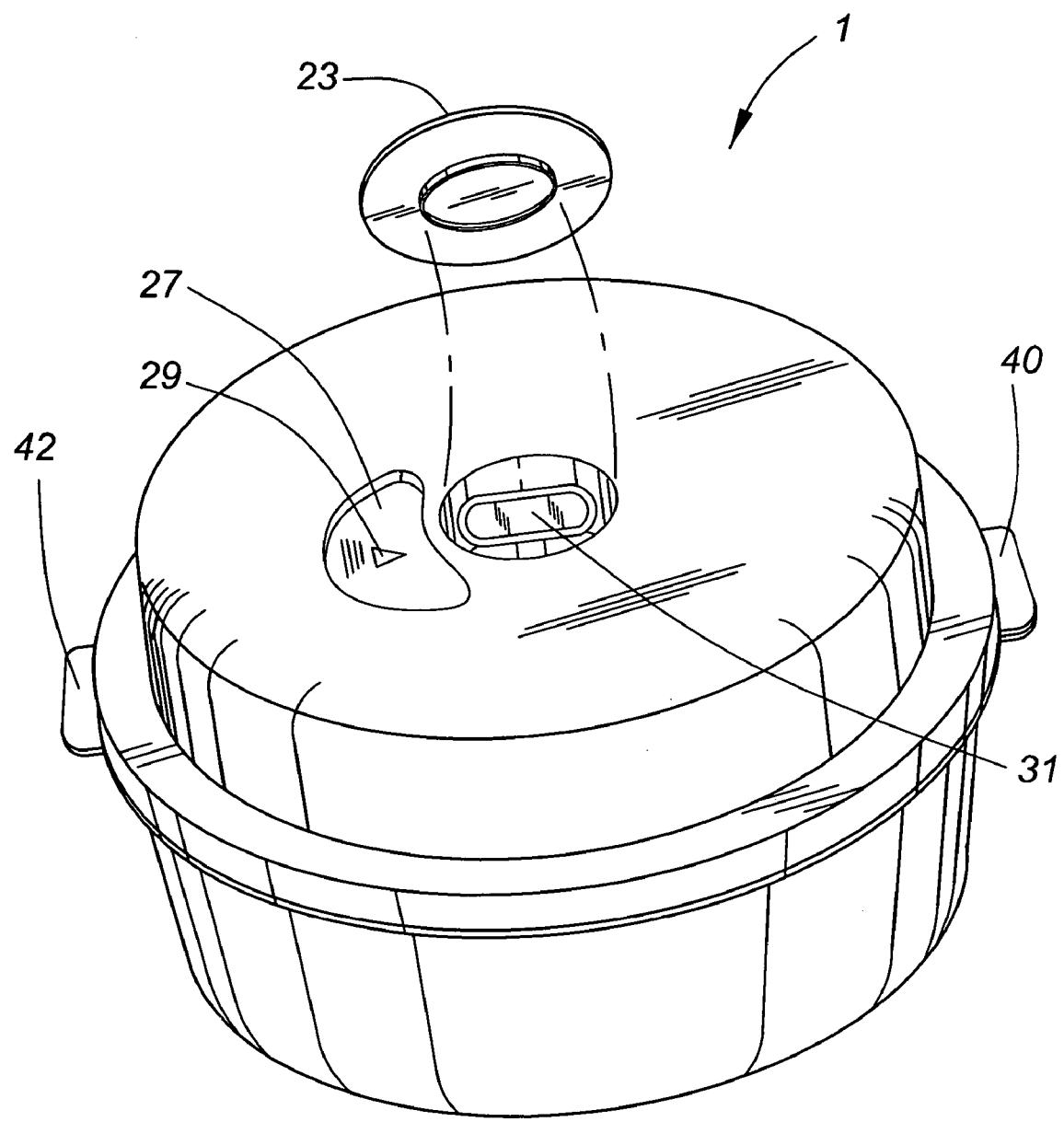
FIG. 4 is a perspective view of the salad shaker with the cap removed.

FIG. 4 illustrates bowl 10, and lid 20 with gripping indent 27. As mentioned above, shaker 1 may also be provided with fins 40, 42, for enabling easy handling. Fin 40 is preferably unitary formed with lid 20, and fin 42 is preferably unitary formed with bowl 10, but they may also be attached using screws, or other fastening means. Also, while the shaker is preferably made of plastic, it can also be made of other suitable materials like glass. It is also possible to use microwave resistant materials for enabling the user to heat the content if required as for example, some Italian recipes (calda, etc.)

The following describes how the serving is obtained. Initially, compartment 15 is filled with dressing and sealed with cover assembly 30, while bowl 10 is stuffed with salad/vegetables. Then, lid 20 with cap 23 snapped fit on well 24 is applied on bowl 10 enabling safe storage/transportation. This is defined as the storage position of the dressing cover assembly 30 for non-contact storage/transportation of the salad and the dressing.

For preparing the serving, the cap 23 is open, tab 31 lifted to remove cover 32 allowing the salad to contact the dressing before agitating the shaker. In the embodiment of FIG. 1B, the cap 23 is replaced and shaker 1 is agitated. In the embodiment of FIG. 1A, circular boss 36 concentrically positioned on top of the dressing cover 32 is lifted until snaps fit in the well 24 and seals the opening 22, and then the shaker is agitated. This is defined as the mixing position of the dressing cover assembly 30.

Although the present invention has been described in considerable detail with reference to certain preferred embodiments thereof, other versions are possible. Therefore, the

I claim

1. A container for non-contact storage of at least two components of a mixture and allowing selective mixing of the components, comprising:
   a bowl for receiving a first component; a compartment provided inside the bowl for receiving a second component;
   a removable lid for enclosing the components inside the bowl wherein said removable lid includes a locking means for engaging with said bowl and wherein said removable lid includes an opening; and
   a cover assembly for sealing the second component into the compartment wherein said cover assembly includes a free end not engaged to said removable lid,
   a removable cap which seals said opening in said removable lid and which overlies said cover assembly
   wherein said opening in said lid allows access to the cover assembly for releasing said second component from the compartment and facilitate mixing of the components.

2. The container of claim 1, wherein the cover assembly comprises a cover for sealing the component in a storage position and a handle attached to the cover for removing the cover and releasing the second component into the bowl in a mixing position.

3. The component of claim 2, wherein the handle is fixed at a first end to the cover and is provided with a tab at a second end, said handle and said tab sized to allow a firm hold of the cover assembly for enabling removal of the cover.

4. The container of claim 1, wherein the lid further comprises a cap for closing the opening during storage and mixing.

5. The container of claim 4, wherein the cap is hingedly attached to the lid and comprises a gripping flap.

6. The container of claim 3, wherein the opening is defined at one end of a well having a lateral wall extending inside the bowl for receiving the tab.

7. The container of claim 6, wherein the cover has a central boss sized to form a snap fit with said well in said mixing position.

8. A salad shaker comprising:
   a bowl having a bottom wall and a lateral wall, the lateral wall having an upper edge;
   a lid having locking means for engaging the upper edge and for closing the shaker, the lid having an opening and a cap for covering the opening;
   a dressing compartment attached to an inside wall of the bowl; and
   a dressing cover assembly including a cover for closing the dressing compartment and a handle attached to the cover and a free end not engaged with said lid,
   wherein, in a storage position the cover seals the dressing compartment, the cap seals and covers the opening and overlies said dressing cover assembly, and the handle assumes a position in the vicinity of the opening to allow firm grip of the handle through the opening.

9. The salad shaker of claim 8, wherein the bottom wall is circular and the lateral wall tapers slightly towards the bottom wall.

10. The salad shaker of claim 8, wherein the opening and the cap are substantially circular.

11. The salad shaker of claim 8, wherein the opening is placed in the center of the lid.

12. The salad shaker of claim 8, wherein the cap is hingedly attached to the lid.

13. The salad shaker of claim 8, wherein the cap further comprises a gripping flap for enabling easy removal of the cap.

14. The salad shaker of claim 8, wherein the lid is substantially dome shaped.

15. The salad shaker of claim 8, wherein the dressing compartment is attached to the bottom wall of the bowl.

16. The salad shaker of claim 8, wherein the dressing compartment and the cover are provided with cooperating latching means for hermetically sealing the dressing container.

17. The salad shaker of claim 16, wherein the cooperating latching means includes a groove provided on the upper rim of the dressing compartment and a lip on the dressing cover.

18. The salad shaker of claim 8, wherein the lid further comprises a well extending from the opening inside the bowl, and wherein in said storage position a tab defined at a free end of the handle extends into the well.

19. The salad shaker of claim 18, wherein in a mixing position said cover is removed to release content of said dressing compartment into the bowl, and wherein said cover comprises a central boss sized to snap fit inside the well to seal said shaker.

20. The salad shaker of claim 8, wherein said cap is provided with a dial showing the week days, and said lid is provided with an arrow to match a preferred serving with a particular day of the week.

* * * * *